UNITED STATES PATENT OFFICE.

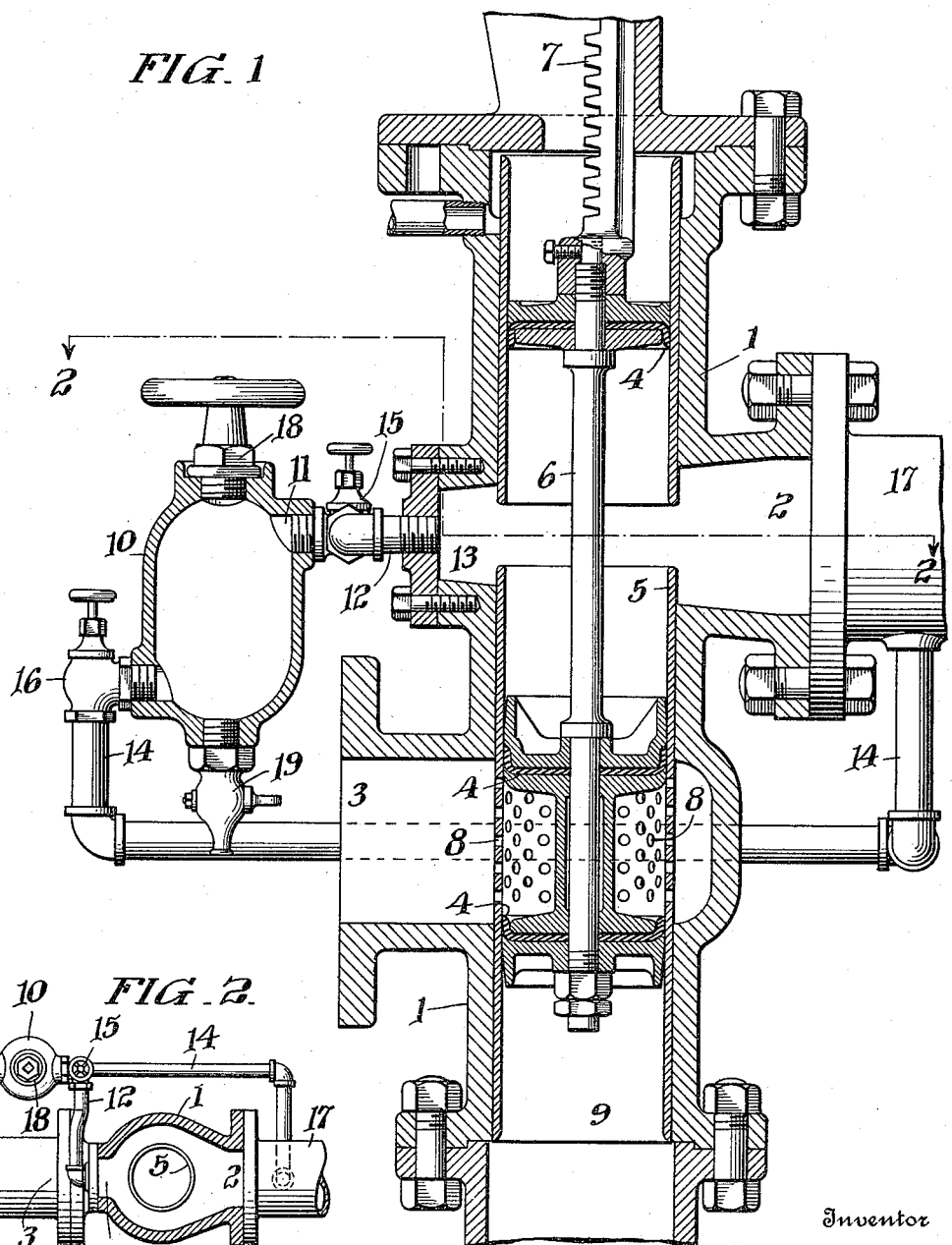

HARRY C. MARTIN, OF PHILADELPHIA, PENNSYLVANIA.

LUBRICATING SYSTEM.

1,157,241. Specification of Letters Patent. Patented Oct. 19, 1915.

Application filed April 26, 1915. Serial No. 23,882.

*To all whom it may concern:*

Be it known that I, HARRY C. MARTIN, a citizen of the United States, residing in the city and county of Philadelphia, State of Pennsylvania, have invented a new and useful Improvement in Lubricating Systems, of which the following is a specification.

This invention relates to a method and apparatus for supplying lubricant to moving parts of the machinery, such as plungers, piston rods and the like, though more particularly to the plunger of an elevator of the hydraulic type.

The object of the invention is to provide a lubricating system in which mechanical devices, such as plungers, differential pistons, stuffing boxes and the like, are eliminated in connection with the lubricant feeding means, and to provide a system wherein the lubricant may be automatically supplied to the moving parts in an efficient and advantageous manner.

A further object of the invention is to provide a lubricating system wherein differential pressures existing in the operating pressure fluid are utilized to feed the lubricant directly into the said pressure fluid and at a point where the two mediums may be advantageously mixed to insure the lubricant being carried into contact with all the movable parts of the apparatus.

A further object of the invention is to provide a lubricating system wherein the quantity of the lubricant to be used is definitely proportioned as to volume with respect to the areas of the moving parts which are exposed to direct contact with the pressure medium and its contained lubricant.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Referring to the drawings: Figure 1 represents a sectional elevation of the main valve for a hydraulic elevator, showing the lubricating system of my invention attached thereto; Fig. 2 represents a section on line 2—2 of Fig. 1.

Similar numerals of reference indicate corresponding parts.

1 designates the valve casing of the main valve for controlling the pressure medium for a hydraulic elevator, the same having a suitable thoroughfare therethrough with which the inlet passage 2 and the outlet passage 3 for the pressure fluid are in communication, though under the control of the valve members 4.

The main valve members 4 are of the usual construction operating within a fixed sleeve 5 and actuated by the valve rod 6 which is connected to the customary operating rack 7. In connection with the valve members 4, it will be noted that the portion of the sleeve 5 bridging the discharge passage is provided with perforations 8 through which the incoming water under pressure is discharged to the conduit leading to the plunger cylinder. In the present instance the valve is shown in its closed or neutral position, indicating that the elevator is at rest or has stopped at a floor, but when the valve has been moved to establish communication between the inlet 2 and the outlet 3, a free passage for the pressure fluid is provided which leads to the elevator plunger to raise the elevator. In case the elevator is to be lowered the valve members 4 are moved in the direction to cut off the main and to establish communication between the passage 3 and the exhaust conduit 9 leading to the sewer or like point.

10 designates a suitable receptacle for containing the supply of lubricant, having an outlet 11 through which the lubricant passes to be conveyed by the pipe 12 into the chamber 13 of the valve casing 1. The outlet 11 is preferably located near the top of the receptacle 10 so that the floating lubricant is forced out to the point of use in advance of the pressure fluid admitted by way of the by-pass pipe 14 to the bottom of the receptacle. In order to restrict or throttle either the lubricant from the receptacle or the supply of pressure fluid, the pipes 12 and 14 are respectively provided with control valves 15 and 16, both preferably being located adjacent to the receptacle. The by-pass pipe 14 leads from the pressure fluid main 17 where it is connected at a point removed from the chamber 13 so that the receptacle is normally subject to the same head or pressure as exists in the main 17.

18 designates a removable plug for controlling the filling inlet to the receptacle and which is of course removed when the receptacle is to be charged with lubricant and then replaced.

A blow valve 19 is preferably provided in the bottom of the receptacle for cleaning purposes, as will be understood.

In the operation of the device the motive fluid normally fills the valve casing chamber 13 at the rear of the valve members 4 and also communicates by way of the bypass pipe 14 with the lubricator receptacle 10 so that both sides of the receptacle are under the same pressure and a balanced condition exists so that no lubricant is fed into the valve casing. When the valve 4 is shifted to establish communication between the passages 2 and 3 for the purpose of operating the elevator, the pressure in the chamber 13 and at the exit end of the main 17 momentarily drops owing to the increased volume created by the movement of the valve and thereby breaks the balanced condition upon the lubricant. In other words, the pressure of the main is held throughout the by-pass 14, giving a preponderance of pressure which overcomes the pressure in chamber 13 and causes the lubricant to be forced into the incoming pressure fluid.

The mixed lubricant and water travel with considerable velocity through the perforated portion of the sleeve, thus becoming thoroughly intermixed so that the resulting mixture entering the plunger cylinder has the contained lubricant uniformly diffused in the water so that all moving parts are evenly coated with lubricant. Furthermore, the effect of the pressure of the water is to cause the lubricant to adhere to the plunger or other adjuncts and form a coating or skin of lubricant extending uniformly over the exposed surfaces.

Attention is directed to the bypass pipe 14 and its connection with the pressure main at a point removed from the chamber 13, since thereby the pressure upon one side of the lubricant in the receptacle is maintained at a maximum irrespective of changed conditions in the chamber 13 due to the movements of the valve. Under ordinary conditions I prefer to open both valves 15 and 16 to their fullest extent so that the first operation of the valve to admit pressure fluid to lift the elevator indirectly causes substantially all the contents of the receptacle 10 to be discharged into the chamber 13 and carried forward past the valve members 4 into the cylinder to lubricate the moving parts. With this in mind it will be noted that the volume of the receptacle is definitely proportioned with respect to the area of the surfaces of the moving parts to be lubricated. This construction insures a definite quantity of lubricant being supplied to the plunger and its adjuncts, so that all the moving parts are coated uniformly with a film of lubricant which has been found to be efficient and operative for days without recharging the receptacle.

In some instances it may be desirable to throttle either the lubricator supply by adjusting the valve 15, or the pressure fluid in the by-pass 14 by adjusting the valve 16, though this depends on conditions and requirements of the service as will be understood.

The method under which my system operates consists generally of utilizing the pressure of the main water supply to create, under normal inoperative conditions, a balancing of pressure upon opposite sides of the lubricator receptacle and under conditions of operation breaking such balanced condition through a differential action whereby a supply of lubricant is forced into the valve casing against the pressure of the motive fluid and becomes intermingled with the said fluid. The steps of the method comprise subjecting a body of lubricant to the pressure of a motive fluid acting in opposite directions upon the lubricant to create a balanced condition, by reducing the pressure at one side of the lubricant to produce a differential action under which the lubricant is projected to a given location against pressure and mixing the lubricant with the pressure fluid.

It will now be apparent that I have devised a new method and apparatus for delivering a lubricant to the moving parts of an elevator cylinder whereby a minimum amount of lubricant operates effectively for a maximum time and is uniformly and evenly distributed over the surface of the moving parts. Attention is further directed to the relation between the area of the surfaces to be subjected to the lubricant and the volume of the lubricant container, since the latter bears a definite ratio to the former whereby an exact quantity of lubricant may be provided to insure proper lubricating of the parts without waste.

It will further be noted by my present invention that I have dispensed with pistons, stuffing boxes, auxiliary pumps and the like which are ordinarily necessary in lubricating systems heretofore in use, with the result that the apparatus by which the method is carried out is simple, inexpensive to construct and install, and may be readily employed with the ordinary hydraulic elevator systems without material change of equipment.

It will now be apparent that I have devised a novel and useful system which embodies the features of advantage enumerated as desirable in the statement of the invention and the above description, and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having now described my invention, what I claim as new and desire to protect by Letters Patent is:

1. In a device of the character stated, a valve casing provided with a thoroughfare having an intermediate chamber, said casing also having an inlet and outlet communicating with said thoroughfare, a valve member for controlling communication between said inlet and outlet, a pressure main connected to said inlet, a lubricator receptacle having communication with said intermediate chamber, and a by-pass between said pressure main and said lubricator receptacle whereby in closed position of said valve the pressures at opposite sides of said receptacle are balanced, while in open position of said valve a difference of pressure is created to cause the lubricant to be ejected into said valve casing.

2. In a device of the character stated, a valve casing provided with a thoroughfare having an intermediate chamber, said casing also having an inlet and outlet communicating with said thoroughfare, a valve member for controlling communication between said inlet and outlet, a pressure main connected to said inlet, a lubricator receptacle having communication between its upper end and said intermediate chamber, and a by-pass between said pressure main and the lower end of said lubricator receptacle whereby in closed position of said valve the pressures at opposite sides of said receptacle are balanced, while in open position of said valve a difference of pressure is created to cause the lubricant to be ejected into said valve casing.

3. In a device of the character stated, a valve casing provided with a thoroughfare having an intermediate chamber, said casing also having an inlet and outlet communicating with said thoroughfare, a valve member for controlling communication between said inlet and outlet, a pressure main connected to said inlet, a lubricator receptacle having communication with said intermediate chamber, and means to create a difference of pressure at the discharge end of said lubricator whereby the lubricant is ejected into said valve casing to mix with the motive fluid.

4. In a device of the character stated, a valve casing provided with a thoroughfare having an intermediate chamber, said casing also having an inlet and outlet communicating with said thoroughfare, a valve member for controlling communication between said inlet and outlet, a pressure main connected to said inlet, a lubricator receptacle having communication with said intermediate chamber, valves for respectively controlling the inlet to and outlet from said lubricator receptacle, and a by-pass between said pressure main and said lubricator receptacle whereby in closed position of said valve the pressures at opposite sides of said receptacle are balanced, while in open position of said valve a differential condition is created to cause the lubricant to be ejected into said valve casing.

5. In a device of the character stated, a valve casing provided with a thoroughfare having an intermediate chamber, said casing also having an inlet and outlet communicating with said thoroughfare, a valve member for controlling communication between said inlet and outlet, a pressure main connected to said inlet, a lubricator receptacle having communication with said intermediate chamber, means to create a difference of pressure at the discharge end of said lubricator whereby the lubricant is ejected into said valve casing to mix with the motive fluid, and means to cause an intermixing of the lubricant with the motive fluid.

6. The method of supplying a lubricant to the moving parts of an elevator cylinder, which consists in subjecting a body of lubricant to equal pressures acting in opposite directions, reducing one of said pressures to cause a movement of the lubricant at a predetermined time, and mixing said lubricant with a motive fluid under pressure.

7. In a device of the character stated, a valve casing provided with a thoroughfare and also having an inlet and an outlet communicating with said thoroughfare, a valve member for controlling communication between said inlet and outlet, a pressure main connected to said inlet, a lubricator receptacle having communication with said thoroughfare and means to create a difference of pressure between the inlet end of said receptacle and the outlet end of said receptacle, whereby the lubricant is ejected from said receptacle into said valve casing.

8. In a device of the character stated, a valve casing provided with a thoroughfare and also having an inlet and outlet communicating with said thoroughfare, a valve member for controlling communication between said inlet and outlet, a pressure main connected to said pressure inlet, a lubricator receptacle having communication with said thoroughfare and having a volume proportioned to the area of the parts to be lubricated, and a by-pass between said pressure main and said lubricator receptacle whereby a difference in pressure created by the lowering of the pressure in the thoroughfare causes the lubricant to be ejected into said valve casing.

In testimony that I claim the foregoing invention I hereunto set my hand this 23rd day of April, 1915.

HARRY C. MARTIN

Witnesses:
ROBERT M. BARR,
FLORENCE DEACON.

Copies of this patent may be obtained for five cents each, by addressing the "Commissioner of Patents, Washington, D. C."